United States Patent [19]

Brandstatter

[11] 3,999,981
[45] Dec. 28, 1976

[54] PRODUCTION AND RECOVERY OF METALLIC CARBIDES FROM ORES AND CONCENTRATES

[75] Inventor: Hans G. Brandstatter, Welland, Canada

[73] Assignee: Ontario Research Foundation, Sheridan Park, Canada

[22] Filed: Apr. 22, 1975

[21] Appl. No.: 570,437

Related U.S. Application Data

[63] Continuation-in-part of Ser. No. 494,972, Aug. 5, 1974.

[52] U.S. Cl. .................................. 75/84; 423/53; 423/440
[51] Int. Cl.² ........................................ C22B 39/00
[58] Field of Search ............ 75/80, 84; 423/49, 53, 423/439, 440

[56] References Cited

UNITED STATES PATENTS

| | | | |
|---|---|---|---|
| 2,137,144 | 11/1938 | Sainderichin | 423/440 |
| 2,553,444 | 5/1951 | Dunn et al. | 423/53 |
| 2,904,426 | 9/1959 | Wainer | 75/84 |
| 3,502,461 | 3/1970 | Guttler et al. | 75/40 |
| 3,900,552 | 8/1975 | Hunter et al. | 423/76 |

*Primary Examiner*—M. J. Andrews
*Attorney, Agent, or Firm*—Sim & McBurney

[57] ABSTRACT

Metal values present as oxides, hydroxides or carbonates in ores or processed concentrates thereof are converted to the corresponding carbide by a solid state reaction with carbon, the carbide then is separated in substantially pure form and may be used directly as ferroalloy or may be converted to the metal.

2 Claims, No Drawings

PRODUCTION AND RECOVERY OF METALLIC CARBIDES FROM ORES AND CONCENTRATES

REFERENCE TO RELATED APPLICATION

This application is a continuation-in-part of application Ser. No. 494,972 filed Aug. 5, 1974.

FIELD OF INVENTION

This invention relates to the recovery of metal values as carbides thereof, particularly from ores or concentrates thereof.

BACKGROUND TO THE INVENTION

Formation of metallic carbides from ore metal values in the solid state generally has not been practised. The present invention allows the production of metal carbides in substantially pure form in a pollutant-free procedure.

SUMMARY OF INVENTION

In accordance with the present invention, metal values present as oxides, hydroxides or carbonates in ores or processed concentrates thereof, are subjected to a single step solid state reduction and carburization reaction with carbon to form the corresponding carbide in accordance with the equation:

$$3MeO + 4C \rightarrow Me_3C + 3CO$$

where Me represents the metal, and the resultant solid mass is beneficiated to separate the carbide in a pure form from the gangue constituents.

GENERAL DESCRIPTION OF INVENTION

Metal carbides exhibit distinctly different physical properties from the various gangue constituents of ores and this allows standard beneficiation methods to be used to recover the metal carbides in substantially pure form. Such beneficiation techniques include gravity, flotation, magnetic and electrostatic treatments, the particular technique or techniques employed depending on the metal carbide and the nature of the gangue constituents.

The conditions utilized to obtain the carbide may vary widely and depend on the particular metal values involved. In general, a shaft or rotary kiln may be employed and the invention may be used on both low and high grade ores.

In instances where the metal, the ore and the conditions are such that large amounts of the metal silicate and aluminate may be formed in preference to the carbide, thereby leading to only low recoveries of the metal values in the form of the carbide, it is preferred to incorporate lime or limestone into the reaction mixture in order to provide a competing reaction for the silica and alumina to form calcium silicate and calcium aluminate rather than the metal silicates and aluminates, thereby resulting in an improved yield of the metal carbide.

While the present invention is described particularly with reference to a single step solid state reduction and carburization reaction using powdered carbon mixed with the ore, concentrate or processed concentrate, the invention is not limited thereto. Thus, a carbon-containing reducing gas or a gas which decomposes to provide carbon under the conditions of reduction, such as methane, may be brought into intimate contact with the material being treated to achieve the single step reduction and carburization.

The invention is applicable to the formation of a large number of carbides from their ores, including those of titanium, zirconium, hafnium, vanadium, niobium, tantalum, chromium, molybdenum, tungsten, manganese, iron, uranium and rare earth metal. Where two or more such elements are present in the ore, selective carburization may be employed to recover individual metal carbides, such as by varying the quantities of carbon used, temperature, gas composition, catalysts, time, and additives such as lime.

The present invention has particular application in the production of ferro-alloys which are used as addition agents to steel. Particular ferro-alloys which are commonly employed are high-carbon ferrochromium and high-carbon ferro-manganese.

By the procedure of the present invention, an iron-chromium or iron-manganese ore may be carburized to provide a mixture of iron and chromium carbides or iron and manganese carbides. Following beneficiation, the carbides may be converted to the metal. Depending on the degree of completeness of the conversion of carbide to the metal, the resulting metal alloy, either ferro-chrome or ferro-manganese, may have a low-carbon content. In many applications in the specialty steel industry low-carbon alloys are preferred to the currently employed high-carbon alloys.

The application of the invention to the production of manganese carbides now will be described.

Commonly employed high-carbon ferro-manganese has the approximate composition 78 to 82% Mn, 7%C, 1% Si and the balance Fe, and is produced by submerged arc smelting of manganese ores. Low carbon, i.e., 0.07 to 1.5%C, materials have been produced in open electric-arc furnaces by reacting manganese-silicon alloys with the ore. High carbon iron-manganese alloys for the steel industry also are produced in blast furnace operations.

The production of manganese carbide from the oxide in the ore in accordance with the present invention requires reaction with carbon and removal of the carbon monoxide as it is produced. This removal of carbon monoxide may be achieved by flushing the reaction vessel with a reducing or an inert gas having a partial pressure of CO below about 0.1 atmospheres, or by maintaining the reaction vessel under a vacuum. The reaction proceeds according to the equation:

$$7 MnO + 10C \rightarrow Mn_7C_3 + 7CO$$

The reduction step may be carried out over a wide range of temperature, preferably about 1100° to 1200° C., although higher temperatures up to about 1350° C., or higher may be used. Loss of manganese in the form of stable compounds such as manganese silicates and aluminates may be prevented by adding a sufficient quantity of lime of limestone to the ore as discussed above.

After separation of the carbide from the resulting gangue constituents by standard beneficiation techniques, there is obtained a manganese carbide product. Since iron oxide generally is present in manganese ores, usually the carbide product consists of a mixture of manganese carbide and iron carbide. It may be possible by selective reduction, first to reduce iron oxide to iron and separate the iron magnetically. Thereafter, the non-magnetic materials may be carburized to form pure magnesium carbide for separation.

When processing low-grade ores or slags containing low levels of metal values, direct carburization of these materials may not be advisable because of the excessive cost incurred in processing large quantities of inert gangue constituents.

In the case of manganese, it has been found that the selective extraction of the manganese values by hydrometallurgical means, followed by precipitation of the values as hydroxide and carburizing the dried hydroxide has yielded a suitable carbide product consisting mainly of manganese and iron carbides. The projected cost of product estimate indicated that this route is economically viable for processing low grade manganese ores.

The carbide formed by this procedure may be converted if desired, to the metal, or an alloy of metals where the recovered carbide is a mixture of metal carbides, by reaction with the metal oxide or mixture of reducible oxides in accordance with the equation:

$$Mn_7C_3 + 3MnO \rightarrow 10Mn + 3CO$$

This reaction is carried out in such a manner as to remove the carbon monoxide as it is formed, typically by flushing with an inert gas, such as argon. Generally, a higher reaction temperature such as about 1100° to 1625° C., is required than that utilized for the carburization step.

Where the metal involved is chromium, different temperature conditions may be employed, for example, the carburization step may be carried out at a temperature of about 1025° to 1425° C. or higher and the reaction between the carbide and oxide at a temperature of about 1300° C. to 1750° C. or higher.

The single step solid state reduction and carburization step used in the present invention may be carried out, if desired, on process-grade metal oxides or hydroxides separated from the gangue constituents of low grade ore or concentrate thereof.

For example, in the formation of pure chromium carbide or high carbon ferro-chrome, process-grade chromium oxide may be subjected to the single step solid state reduction and carburization step, the process-grade chromium oxide being formed from a low grade chromite ore, or a concentrate thereof, by roasting the ore or concentrate under oxidizing conditions with alkali salts, typically sodium carbonate. Lime commonly also is incorporated in the roasted mixture to accelerate the oxidation procedure and to form insoluble compounds with part of the silica and alumina values of the ore. In this way, the chromium values are converted to soluble chromate. The iron values of the ore are not solubilized in this procedure and hence, on leaching of the roasted material with water, the solubilized chromium values are separated from the undissolved solid which contains the iron values, other unsolubilized values of the ore and insoluble compounds.

The alkali roast causes solubilization of at least some of the silica and alumina values in the ore and hence the aqueous solution resulting from the leach contains dissolved quantities of sodium silicate and sodium aluminate.

The pH of the solution is adjusted to a more acid value to cause precipitation of alumina and silica which are separated from the aqueous phase, which now is substantially free from dissolved alumina and silica values. The pH may be adjusted using sulphuric acid or carbon dioxide. It is preferred to use carbon dioxide since the alkali metal values of the silicate and aluminate remain as carbonate, which may be recovered later and recycled. When sulphuric acid is used, sodium sulphate remains in solution, which may be separated and sold if desired.

The aqueous solution remaining after separation of silica and alumina contains dissolved quantities of a sodium chromate. The form of the sodium chromate depends on the pH resulting from the acidification. At pH's of about 6, the sodium chromate is $Na_2CrO_4$ whereas at pH's of about 3, the sodium chromate is sodium dichromate $Na_2Cr_2O_7$.

Where the pH of the solution is lowered to provide the dichromate, it is preferred to evaporate the solution and preferentially crystallize sodium bicarbonate which is separated and recycled to the ore roasting. After removal of the bulk of the excess alkali values in this way, the chromate solution is slurried with powered carbon and reacted to form process grade chromium oxide by a solid state reaction for use in the formation of chromium carbide by the process of the invention.

Alternatively, where the pH of the solution is lowered to provide the chromate, it is preferred to slurry the solution with carbon, evaporate the slurry to dryness and form chromium oxide from the mixture by a solid state reaction.

The solid state reaction of the chromate of the oxide may be represented by the equation:

$$Na_2Cr_2O_7 + 2C \rightarrow Cr_2O_3 + Na_2CO_3 + CO$$

The sodium carbonate may be separated from the chromic oxide by water leaching and crystallization. In addition, dilute acid may be used to remove traces of soda ash more expediently.

Since sodium carbonate is formed in this reaction it is preferred that the sodium chromate reacted is in admixture with sodium carbonate, achieved by utilization of carbon dioxide to acidify the leach liquor, so that separation of the materials leached from the chromic oxide is unnecessary prior to recycle of sodium carbonate.

The process grade chromic oxide resulting from this procedure may be subjected to a solid state reduction and carburization to chromium carbide by the process of the present invention in accordance with the equation:

$$2Cr_2O_3 + 7C \rightarrow Cr_4C + 6CO$$

The chromium carbide $Cr_4C$ is sometimes written, perhaps more accurately, as $Cr_{23}C_6$. This chromium carbide is the member of a family of chromium carbides, including $Cr_4C$, $Cr_7C_3$ and $Cr_3C_2$, which has the lowest carbon content and hence is the most acceptable product as a steel making additive where low carbon additions are required.

In order to promote interaction between the oxide and the carbon in the solid state and hence increase the efficiency of the reaction, it is preferred that the components are in intimately mixed finely divided form and agglomerated. Preferably this is achieved by slurrying powders of the materials together, preferably in −300 mesh particle size, more preferably −400 mesh particle size, followed by dewatering of the slurry and partial drying of the mixture prior to agglomeration.

The precise form of the chromium carbide depends on the quantity of carbon used and the reaction temperature, since the lower temperatures promote the formation of lower carbon content carbides. Preferably, the amount of carbon employed corresponds to the stoichiometry of the above equation, although other carbides, such as $Cr_3C_2$ and $Cr_7C_3$ may be formed at will by use of the appropriate quantity of carbon and temperature range.

Iron oxide, preferably at least part of that separated with the gangue constituents, may be mixed with the chromium oxide and carbon to provide thereby, after reaction, a high carbon ferro-chrome alloy for use in steel making.

EXAMPLES

The invention is illustrated by the following Examples:

EXAMPLE I

An ore concentrate containing 26.9% Cr and 22.4% Fe was mixed with the stoichiometric quantity of finely-divided (−400 mesh) graphite containing 95% fixed carbon to form $Cr_3C_2$ from the chromium and $Fe_3C$ from the contained iron values.

Two separate samples of the concentrate were provided, sized as follows:

|  | Sample 1 | Sample 2 |
|---|---|---|
|  | wt.g. | wt.g. |
| +200 | 0.85 | — |
| −200 + 400 | 3.90 | 0.25 |
| −400 + 500 | 1.37 | 1.20 |
| −500 | 4.43 | 4.6 |
| TOTAL | 10.55 | 6.05 |

The charges for each test were slurried with water, stirred for 10 minutes, partially dried and pelletized to pellets of approximately ¾ inch diameter.

The pellets were held for about 7 hours and 20 minutes at a temperature of about 1300° to 1400° C. under a stream of argon flowing at 0.05 CF/min.

The products, after cooling overnight, were observed to be dark gray in colour and strongly magnetic. The product pellets from test 1 weighed 84.6g from a charge of 126g and the pellets from test 2 weighed 56.5g from a charge of 90g.

Part of the products from test 2 was shatter boxed and a sample was found to contain 28.0% Cr, 26.0% Fe, 4.58% C and the balance gangue.

The shatter boxed product from test 2 was subjected to low intensity dry magnetic separation. 89.7% of the chromium values contained in the carburized product were recovered in the magnetic fraction which graded 39.9% Cr, 35.2% Fe and 5.16% C. An X-ray diffraction analysis indicated the fraction contained 70% $Cr_7C_3$, 20% metallic Fe and the balance minor unidentified substances.

EXAMPLE II

A charge of 100 gms of an ore containing 49.3% Mn, 2.8% Fe, 5.9% $SiO_2$ and 3.52% $Al_2O_3$ (ground to 100%−200 mesh), 26.6 gms of CaO (100%−200 mesh) and 28.7 gms of graphite (100%−400 mesh, 95% fixed carbon) was mixed with water and the resultant slurry was thoroughly stirred and partially dried to give a thick paste which was formed into pellets approximately 1¼ inches in diameter. The pellets were allowed to dry overnight.

Samples of the pellets were heated to a reaction temperature while being subjected to a vacuum and held at the reaction temperature for a certain period of time. The conditions are outlined in the following Table I:

TABLE I

| Test No. | Heating up Time (min.) | Heating Time (min.) | Max. Temp. ° C. | Lowest Pressure attained |
|---|---|---|---|---|
| 1 | 85 | 64 | 1343 | 3×10⁻³mm Hg. |
| 2 | 76 | 120 | 1371 | 46 cm Hg. |

After cooling, the product was subjected to a heavy liquid separation using Clerici solution and the fractions analyzed for Mn, Fe and C contents. The results are reproduced in the following Table II:

TABLE II

| Test No. | Wt. % | Wt. gm. | Fe Wt. % | Fe Wt. gm. | C Wt. % | C Wt. gm. | Mn Wt. % | Mn Wt. gm. | Distribution % |
|---|---|---|---|---|---|---|---|---|---|
| 1 Product | 100 | 19 |  |  |  |  |  |  |  |
| Sink | 49.47 | 9.4 | 2.12 | 0.20 | 6.68 | 0.62 | 77.8 | 7.31 | 77.7 |
| Float | 50.53 | 9.6 | 1.85 | 0.17 | 11.70 | 1.12 | 21.9 | 2.10 | 22.3 |
| 2 Product | 100 | 10 |  |  |  |  |  |  |  |
| Sink | 72.0 | 7.2 | 4.50 | 0.324 | 6.54 | 0.47 | 85.80 | 6.17 | 82.6 |
| Float | 28.0 | 2.8 | 3.14 | 0.087 | 18.00 | 0.50 | 46.6 | 1.3 | 17.4 |

EXAMPLE III

A low grade manganese ore from Steep Rock Iron Mines containing 4.6% manganese, 34% total iron, 34.4% $SiO_2$, 1% $Al_2O_3$, 0.24% CaO, 0.20% MgO and 0.09% iron, sized −4 mesh or −65 mesh was slurried with water and 20 to 40% solids and leached with $SO_2$ gas at 0.5 to 1.0 ml/min/g are at 70° C for 4 hours employing mechanical agitation. Extraction of manganese ranged from 89 to 99% and the bulk of the iron remained in the leach residue. The Mn/Fe ratios in the leach liquors ranged from 1.5 to 3.5 with manganese concentrations ranging from 9 to 19 g.p.l. A recovery of 81.5% of the dissolved manganese values was obtained by simple hydrolytic precipitation at pH 10 with ammonia. Dry hydroxide products exhibited Mn/Fe ratios of up to 3.1:1.

One such precipitate was dried at 110° C for 1 hour and analyzed 28.8% Mn and 16.8% Fe. 50 g of this material were blended with 27.2 g of —400 mesh graphite. The loose mixture was placed in a closed alumina tube swept with nitrogen. The temperature was raised slowly to 1350° C and held thereat for 1 hour. Upon cooling to room temperature the carburized product was dumped into water containing a wetting agent. Excess carbon was readily washed from the product which settled quickly at the bottom of the wash vessel.

The heavy metallic fraction weighed 23.6 g and analyzed 49.2% Mn, 28.7% Fe, 5.98% combined carbon, 0.043% P and the balance gangue constituents. Recovery of manganese from the dried precipitate into the metallic carbide fraction amounted to 80.6%.

SUMMARY

The present invention therefore, provides a process for the recovery of metal values from ores by direct carburization of the metal oxide values of the ore. Modifications are possible within the scope of the invention.

What we claim is:

1. A method for the formation of chromium metal, which comprises subjecting an ore or concentrate thereof containing chromium in oxide, hydroxide and/or carbonate form and gangue constituents to a single step solid state reduction and carburization reaction by heating said ore or concentrate thereof and carbon in intimate admixture at a temperature of from 1025° C to about 1425° C to convert said chromium in oxide, hydroxide and/or carbonate form to a chromium carbide; after completion of said solid state reaction, physically separating said chromium carbide in substantially pure form from said gangue constituents; and reacting said substantially pure chromium carbide with chromium oxide in a solid state reaction at a temperature of about 1300° to about 1750° C to form chromium metal.

2. A method for the formation of a chromium carbide in substantially pure form, which comprises roasting a low grade chromite ore or concentrate thereof containing chromium, iron, aluminum and silicon values with sodium carbonate in the presence of oxygen to solubilize substantially all the chromium and at least part of the aluminum and silicon values of said ore while leaving said iron values substantially unaffected, leaching the roasted ore to separate soluble compounds from gangue constituents including said iron values and the remainder of said aluminum and silicon values, increasing the acidity of the leach solution with carbon dioxide to cause deposition of said soluble aluminum and silicon values, separating the deposited materials from the acidified solution to provide an aqueous solution of a sodium chromate and a sodium carbonate, concentrating the latter aqueous solution to provide a solid mixture of a sodium chromate and a sodium carbonate, providing said solid mixture in finely divided form and in admixture with finely divided carbon, reacting the components of said admixture in the solid state to form a product mixture containing sodium carbonate and process-grade chromium oxide containing residual gangue components, leaching said product mixture to form an aqueous solution of said sodium carbonate, separating said aqueous solution from said process-grade chromium oxide, recovering solid sodium carbonate from the latter aqueous solution, recycling said solid sodium carbonate to said roasting step, subjecting said process-grade chromium oxide to a single step solid state reduction and carburization reaction with carbon to convert said chromium oxide to a chromium carbide, and, after completion of said latter solid state reaction, physically separating said chromium carbide from said residual gangue components.

* * * * *